July 25, 1944.  S. B. HOLMES  2,354,374
LOCK NUT
Filed May 17, 1943
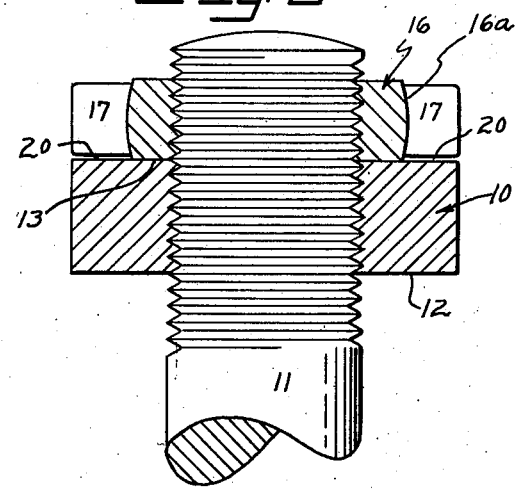
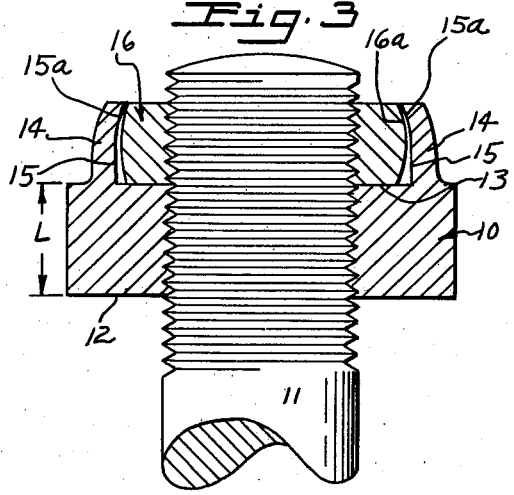
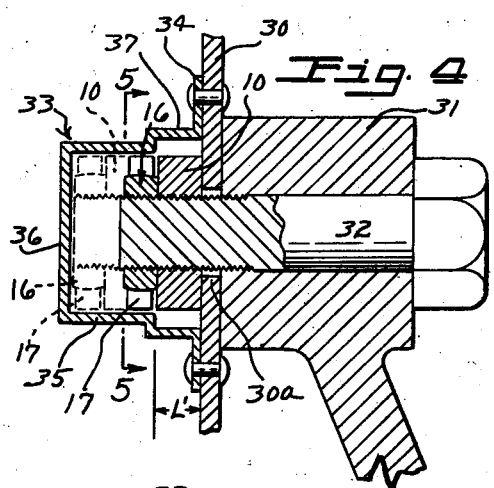
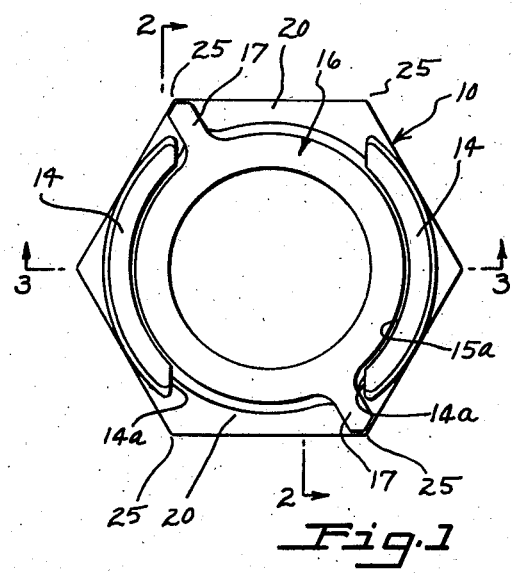
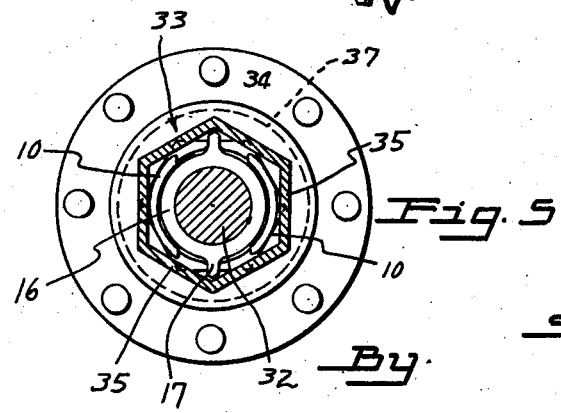
Inventor
Stanley B. Holmes Patented July 25, 1944

2,354,374

UNITED STATES PATENT OFFICE 2,354,374

LOCK NUT

Stanley B. Holmes, Santa Monica, Calif.

Application May 17, 1943, Serial No. 487,268

8 Claims. (Cl. 151—15)

This invention has to do with nuts of the type known as lock nuts or locking nuts; and the invention has as its general purpose the provision of a simple effective combination embodying a primary nut and a locking nut associated in a simple and effective manner so as to be easily applied and locked, easily removed when desired, and not liable to de-arrangement in long continued use.

The invention also contemplates a further special arrangement and combination wherein the improved nut can be used in normally inaccessible locations. This feature of the invention, together with the general nature of the locking nut combination will be best understood from the following detailed description, referring to the accompanying drawing, in which Fig. 1 is a plan view of a typical nut combination embodying the invention;

Fig. 2 is a section taken as indicated by line 2—2 on Fig. 1;

Fig. 3 is a section taken as indicated by line 3—3 on Fig. 1;

Fig. 4 is a longitudinal section showing a typical arrangement for the use of my improved locking nut in an inaccessible position, and Fig. 5 is a section taken as indicated by line 5—5 on Fig. 4.

In the drawing the main or primary nut is designated generally by the numeral 10, this being the nut which, threaded on bolt or stud 11, is adapted to seat against the surface of the member which is held by the nut. The numeral 12 designates the seating surface of the primary nut. The outer face of the primary nut—the face opposite seating surface 12—is recessed as shown in Figs. 1 and 2 with a recess which can be described as generally cylindric in formation, and having a bottom surface 13 and side walls 14 with side wall surfaces 15. As initially formed, these side wall surfaces 15 are initially substantially cylindric, the overhanging portions 15a, shown in Fig. 3, being forced over after the locking nut 16 is placed in the recess.

The locking nut proper 16 is preferably in the form of a circular annulus with either one or two opposite projecting lugs 17, shown in Figs. 1 and 2. To accommodate the projecting lugs 17 wall 14 of the recess in the primary nut is cut away at the opposing portions shown at 20 in Figs. 1 and 2 so that, in those cut-away portions of the recess wall, the recess bottom 13 extends out to the exterior surface of primary nut 10. The locking nut 16 is, by this arrangement, rotatable relative to the primary nut through an angle which is fixed by the width of cut-away portions 20, the ends 14a of the recess side walls 14 forming stops which limit the rotation of the locking nut.

As previously indicated, locking nut 16 is inserted in the recess at a time when the recess side wall 15 is substantially cylindric. The locking nut preferably fits in the recess with a small radial clearance, so as to be freely rotatable. After insertion of the locking nut, the outer portions of recess walls 14 are forced over so that the outer part 15a of the wall surface overhangs nut 16 to hold the nut in place in the recess. The overhanging part of the wall preferably fits around the nut somewhat loosely so as to allow free rotation of nut 16. However, if desired, the walls 14 may be made, or forced over, so as to lightly frictionally engage nut 16 to hold it lightly in any position in which it is placed—for instance, it's backed off position. To facilitate the holding function, the outer surface of nut 16 is curved, as seen in Figs. 2 and 3, as at 16a. The construction thus allows the outer face of nut 16 to be flush with the outer face of primary nut 10, and at the same time holds the two nuts together without any danger of accidental separation; so that the two nuts are always assembled in proper relation for immediate use.

Cut-away portions 20 and wall shoulders 14a are so located in the primary nut 10 that in the two limiting positions of lugs 17 those lugs line up substantially with one or the other of two sets of outer corners 25 of the primary nut. Fig. 1 shows the lug 17 of the locking nut close to its limiting position of "back-off," and close to a position where the two lugs 17 substantially register with two opposite nut corners 25. It is of some practical importance that the lugs 17 bear the described relation to one set of nut corners when the locking nut is fully backed off; and it is also of some importance that the overall diameter of lugs 17 be substantially the same as the overall diameter of opposite nut corners 25; so that in the backed-off position of the locking nut, the outer edges of lug 17 substantially form continuations of the corner edges of the main nut. These relations facilitate application of a wrench to the primary nut with the locking nut in backed-off position, and also facilitate certain operations and uses described later. On the other hand it is not so important that the position and exent of cut-away portions 20, and the positions of the wall ends, 14a, be such that the lugs 17 register with the other designated pair of nut corners 25 when the locking nut is rotated fully to the right from the position shown in Fig. 1. It is desirable however that the construction be symmetric, as is shown in Fig. 1.

The thickness of the two nuts 10 and 16 may bear any desired relation to each other; in practice they may be of about equal thicknesses (speaking of the thickness of nut 10 between its face 12 and recess bottom 13); or either one or the other may be the thicker.

I am assuming through this description that the combined nut has a right-handed thread. On that assumption, the threads in both nuts are tapped so that the thread through them is continuous when the parts occupy substantially the position shown in Fig. 1, with the locking nut backed off to the left to substantially its limiting position. With the threads so cut, the whole nut combination may then be easily run onto a bolt or stud by applying right-handed rotation directly to primary nut 10. During that operation the locking nut 16 will tend to drag behind to the relative position shown in Fig. 1; in which position its lugs 17 do not interfere with application of the wrench to the full length of the faces of primary nut 10. Then, after nut 10 is set up by rotative force applied to it, the locking nut is then set up by rotative force applied to its lugs in a right-handed direction.

The threads in the nuts are cut so that their looseness of fit on the bolt or stud is taken up before lugs 17 have been rotated right-handedly to their limit of rotation with reference to primary nut 10. For instance, in a design as here shown the limit of relative rotation is about 60°, and it is intended that the looseness of fit be taken up and the nuts tightly locked when locking nut 16 has been rotated say about 30° with reference to the primary nut. The remaining 30° of possible rotation of the locking nut then takes care of irregularities in manufacture and wear.

Figs. 4 and 5 show an arrangement for using the lock nut combination in normally inaccessible locations. As an instance, the numeral 30 may represent the wall of a fuel tank and 31 a mounting bracket. 32 represents a stud or cap screw which might, for instance, be normally screwed into a threaded boss on the wall of the tank. Instead, my lock nut may be used, inside the tank wall, to receive screw 32 and to set up tight and automatic lock.

I provide a socket 33 in the form of a flanged cup which has a mounting flange 34 around its open end, a hexagonal or other suitably shaped side wall 35 adjacent its bottom or closed end 36, and a side wall 37 of larger diameter adjacent its open end. The relatively enlarged wall 37 is indicative of any formation which will not engage the nuts to hold them against rotation; and hexagonal wall 35 is indicative of any formation which will so engage the nuts. In the particular design here shown the socket is made with solid walls and bottom and may be riveted or welded to the tank wall to form a fluid tight seal over a stud opening 30a. But, as far as its nut holding functions are concerned the socket needs no bottom 36 and its walls 35 and 37 need only be respective formations which will and will not engage the nuts.

The combination nut is placed in the socket when the latter is mounted. When stud 32 is inserted it pushes the whole nut back against end wall 36 into the hexagon formation 35, to such a position as shown in dotted lines in Fig. 4. In that position the hexagon nut 10 engages in formation 35, that formation being deep enough for that purpose. Screw 32 is then turned, when it threads into nut 10 and then begins to pull the whole nut combination forward. When the nut combination was originally placed in the socket, the locking nut 16 was put in its backed off position so that its lugs 17 are engaged by hexagon formation 35, and as long as both the lugs 17 and nut 10 remain in engagement with the hexagon formation the two nuts are held in their relative position in which nut 16 is backed off. So, as screw 32 is turned, it screws through nut 10 and into locking nut 16 and continues to draw both nuts forward in their same relative positions until the primary nut 10 finally leaves the hexagon formation. It does that just before, or at just about the time that, its seat face engages the inner face of the tank wall. That is, the distance L' between the right hand end of hexagon formation 35 and the wall face is not less than the effective hex-formation length of nut 10. In the design as here illustrated that effective length is about equal to the dimension L in Fig. 3. Fig. 4 shows the distance L' to be about equal to L, or slightly greater. Thus, before nut 10 finally seats or seats tightly on the wall face it is released to turn with screw 32—that is, right-handedly with relation to nut 16 whose lugs 17 are still held in hexagon formation 35. That relative rotation of the nuts causes nut 10 to set up on nut 16; or, what is the same thing, causes nut 16 to set up on nut 10 as the latter is seated up tightly on the tank wall. The final position is shown in full lines in Fig. 4, and in Fig. 5. Screw 32 can be unscrewed at any time by simply backing it off. It will come hard until the drag of the screw backs nut 10 off slightly from nut 16, when the screw can then be run out easily.

If, on reinsertion of the screw, or on its original insertion, both nuts are not in their relative backed-off position so as to be engaged or engageable in the hexagon formation in that relative position, they may be placed in the desired position by using a suitable tool—such as a screw with a thread which fits the threads of nut 10 somewhat tightly. Such a tool can be threaded into nut 10 one or two turns, the nuts pulled out to the full line position of Fig. 4, and then the unscrewing of the tool will back nut 10 off from nut 16. As soon as the tool is free the nut combination can be immediately pushed back into the hexagon formation in proper position to receive screw 32.

I claim:

1. In a locking nut combination which comprises a primary nut having a body of polygonal exterior formation and having a seat face adapted to seat on a face of the member held by the nut, and a locking nut with a thread forming a continuation of the thread in the primary nut and adapted to seat against an outer face of the primary nut; the improvement which includes a bottomed central circular recess in the outer face of the primary nut body, said recess having a bottomed recess extension within the nut body which opens out to at least one side of the primary nut body, the recess being surrounded and the extension being laterally delimited by circumferential walls formed integrally of the body of the primary nut and lying within the circumferential confines of that body, the recess bottom face being completely annular in a plane normal to the axis of the nut to form a completely annular seating face for the locking nut, and the central recess and the recess extension lying in the same plane, the locking nut having a circularly annular body of a diameter less than that of the primary nut, said annular body received within said recess and having a wholly annular bottom face seated on the annular bottom face of the recess and held to that face by overhangs of the recess wall, the locking nut having an extending lug which projects radially outwardly from the annular body into the recess extension and which reaches outwardly to a radius substantially not greater than that of the primary nut body, and the bottom faces of the annular body and of the extending lug being substantially co-planar.

2. A locking nut combination as specified in claim 1, and in which the primary nut has two opposite recess extensions and the locking nut has two opposite lugs 3. A locking nut combination as specified in claim 1, including in further combination an open-ended nut receiving socket adapted to be secured with its open end against the member to be held, said socket having a non-nut-engaging portion adjacent its open end and having also a portion, further from its open end, with a formation adapted to externally engage both the primary nut and the locking nut lug to hold them against rotation.

4. In combination with a locking nut assembly which includes a primary nut and a locking nut having non-circular external configurations which are longitudinally alignable with each other when the threads in the two nuts are in continuous alignment; a holding socket for the nut assembly, said socket having an open end adapted to be secured against a member to be held, the socket having a non-nut-engaging portion adjacent its open end and having also a portion, further from its open end, with a formation adapted to externally engage both the primary and locking nuts to hold them against rotation.

5. A combination as specified in claim 4, and in which the axial length of the first mentioned socket portion is substantially equal to and not less than the axial length of the non-circular external configuration of the primary nut.

6. A holder for a locking nut assembly which includes a primary nut and a locking nut having non-circular external configurations which are longitudinally alignable with each other when the threads in the two nuts are in continuous alignment; said holder comprising a socket having an open end adapted to be secured against a member to be held, the socket having a non-nut-engaging portion adjacent its open end and having also a portion, further from its open end, with a formation adapted to externally engage both the primary and locking nuts to hold them against rotation.

7. A holder as specified in claim 6 and in which the axial length of the first mentioned socket portion is substantially equal to and not less than the axial length of the non-circular external configuration of the primary nut.

8. In a locking nut combination which comprises a primary nut having a body of polygonal exterior formation and having a seat face adapted to seat on a face of the member held by the nut, and a locking nut with a thread forming a continuation of the thread in the primary nut and adapted to seat against an outer face of the primary nut; the improvement which includes a central circular recess in the outer face of the primary nut body, said recess having a bottomed recess extension within the nut body which opens out to at least one side of the primary nut body, the recess being surrounded and the extension being laterally delimited by circumferential walls formed integrally of the body of the primary nut and lying within the circumferential confines of that body, the recess bottom face being completely annular in a plane normal to the axis of the nut to form a completely annular seating face for the locking nut, and the central recess and the recess extension lying in the same plane, the locking nut having a circularly annular body of a diameter less than that of the primary nut, said annular body received within said recess and having a wholly annular bottom face seated on the annular bottom face of the recess and held to that face by overhangs of the recess wall, the locking nut having an extending lug which projects radially outwardly from the annular body into the recess extension and which reaches outwardly to a radius substantially equal to that of a corner of the exterior polygonal formation of the primary nut body, the bottom faces of the annular body and of the extending lug being substantially coplanar, and the location of the recess extension on the primary nut being such that when the locking nut lug is rotated relatively to its limiting backed-off position the lug lies substantially in register with an external corner of the primary nut.

STANLEY B. HOLMES.